Figure 1:
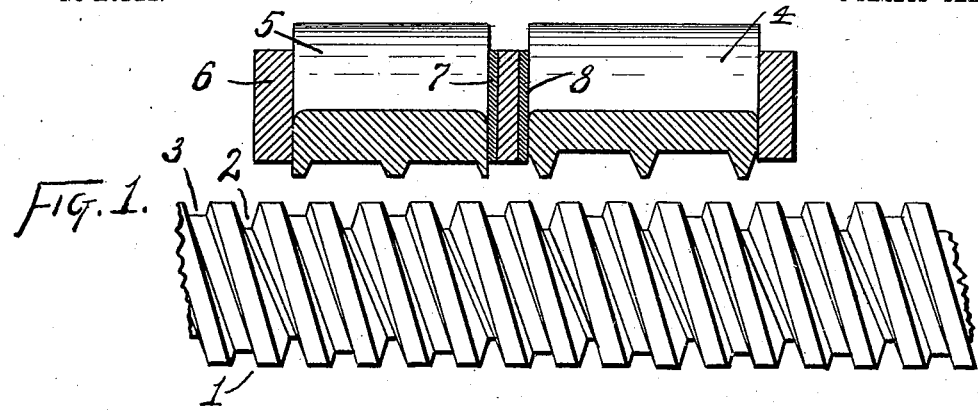

No. 725,779. PATENTED APR. 21, 1903.
W. L. SCHELLENBACH.
SCREW MECHANISM.
APPLICATION FILED APR. 28, 1902.
NO MODEL. 3 SHEETS—SHEET 1.

Witnesses:
E. R. Shipley
M. S. Belden

William L. Schellenbach
Inventor
by James W. See
Attorney

No. 725,779. PATENTED APR. 21, 1903.
W. L. SCHELLENBACH.
SCREW MECHANISM.
APPLICATION FILED APR. 28, 1902.
NO MODEL. 3 SHEETS—SHEET 2.
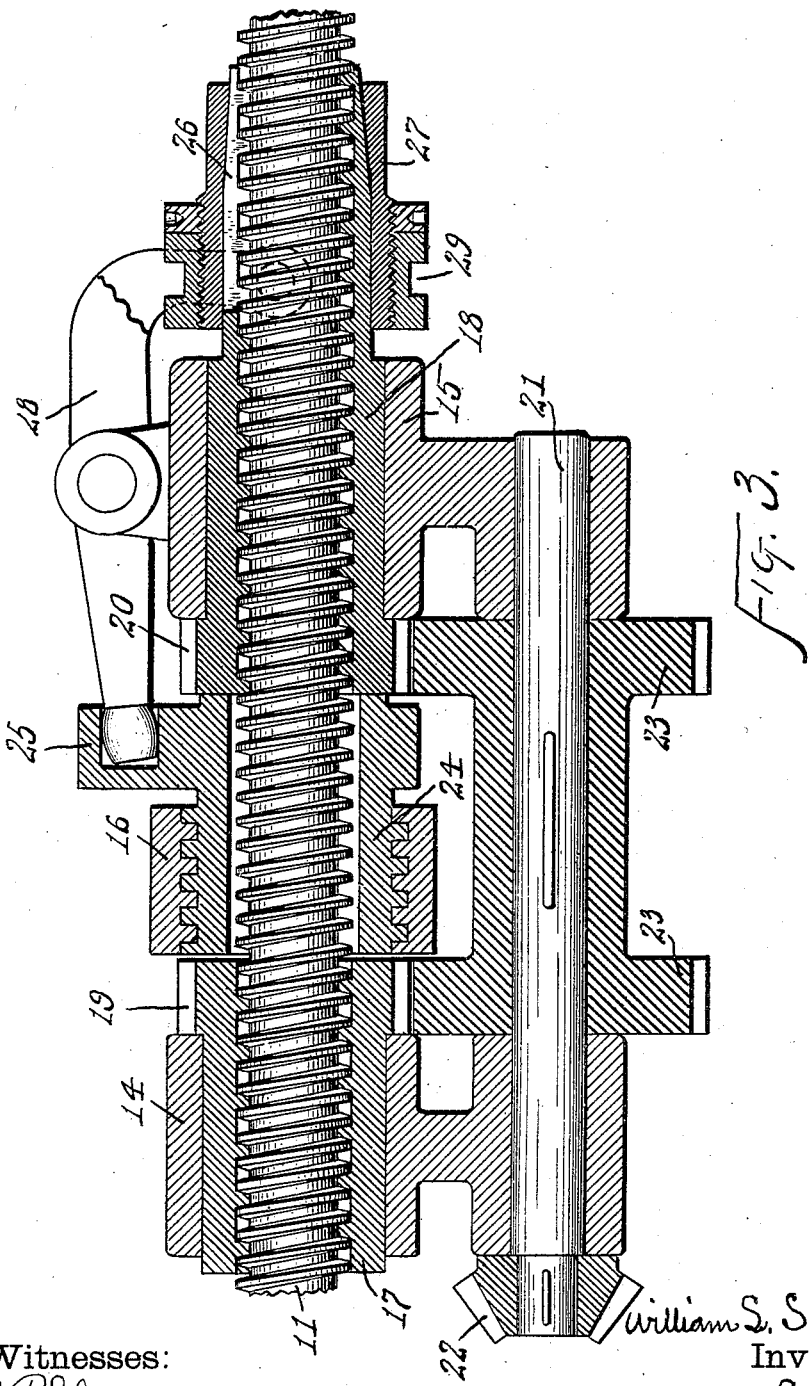
Witnesses:
E. R. Shipley.
M. S. Belden.
William L. Schellenbach
Inventor
by James W. See
Attorney

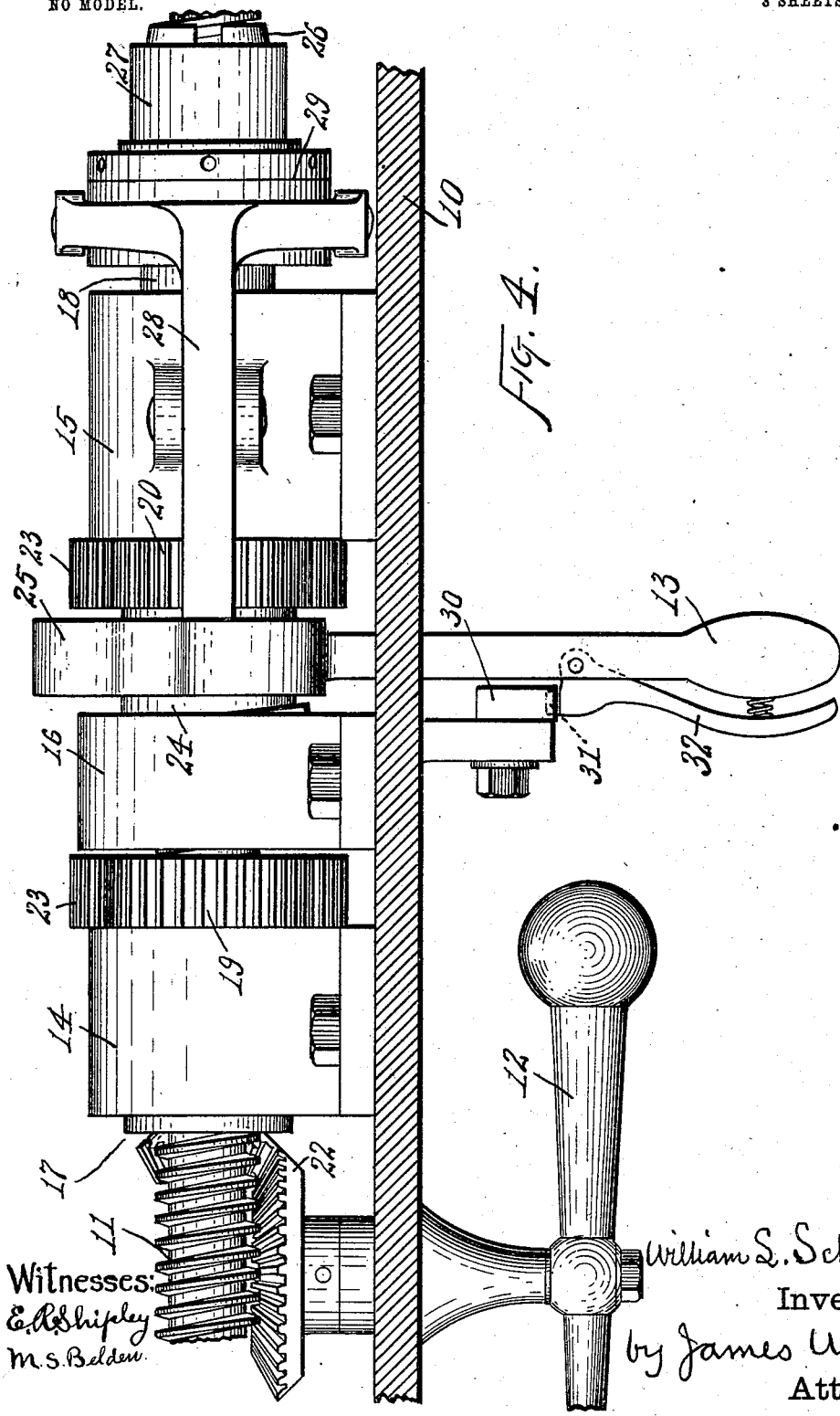

UNITED STATES PATENT OFFICE.

WILLIAM L. SCHELLENBACH, OF CINCINNATI, OHIO, ASSIGNOR TO THE NATIONAL MACHINE TOOL COMPANY, OF CINCINNATI, OHIO.

SCREW MECHANISM.

SPECIFICATION forming part of Letters Patent No. 725,779, dated April 21, 1903.

Application filed April 28, 1902. Serial No. 104,915. (No model.)

*To all whom it may concern:*

Be it known that I, WILLIAM L. SCHELLENBACH, a citizen of the United States, residing at Cincinnati, Hamilton county, Ohio, have invented certain new and useful Improvements in Screw Mechanism, of which the following is a specification.

When a screw is employed as a precision device, it is of high importance that the accuracy of the screw be not impaired by its employment for other than precision purposes. A screw mounted for precision purposes unfortunately offers very convenient facilities for other and more or less destructive uses, and it has generally been recognized in many machines either that the accuracy of the precision-screw must be sacrificed to a greater or less degree as a matter of expediency or that alternative devices must be provided to take the place of the screw in non-precision work. For instance, in an ordinary engine-lathe the accuracy of the screws produced depends upon the original and maintained accuracy of the lead-screw of the lathe. If the lead-screw be employed also for general feeding purposes, then its accuracy becomes very much impaired by wear. Especially is the result of wear noticeable at that portion of the lead-screw immediately at the front end of the arbor where the carriage is located in doing a very large proportion of the work done upon the lathe. It may be laid down as a general proposition that the engine-lathe employing its lead-screw for general feeding purposes has always a defective lead-screw. Engine-builders have very wisely in some cases provided two screws, one for general feeding purposes and the other held sacred for screw-cutting. Again, the lead-screw has been reserved for screw-cutting only, and the general feeding-movement has been produced by rack-and-pinion mechanism driven from a splined rod mounted parallel with the lead-screw.

It is the purpose of my invention to produce a screw mechanism in which a single screw may serve for precision purposes and for general purposes, the accuracy of the screw for precision purposes not being impaired by reason of its use for general purposes. Thus in an engine-lathe the single screw may serve for screw-cutting and for general feeding, and being driven by a single transmitting device or gearing all of the ranges of pitches available for screw-cutting become also available for general purposes.

My invention will be readily understood from the following description, taken in connection with the accompanying drawings, in which—

Figure 2:
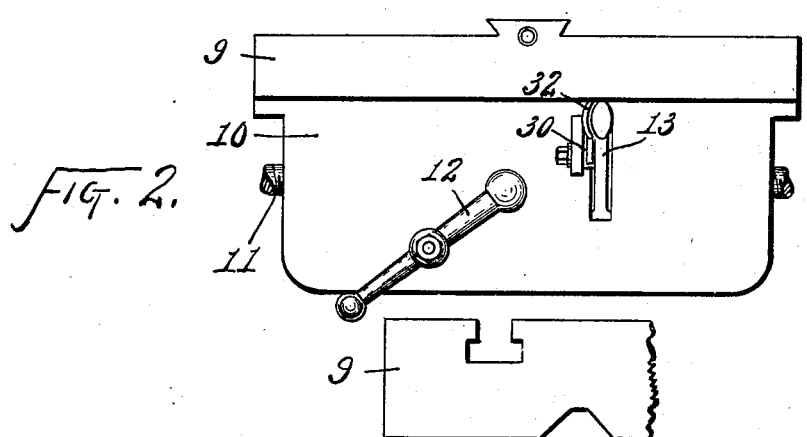
Figure 5:
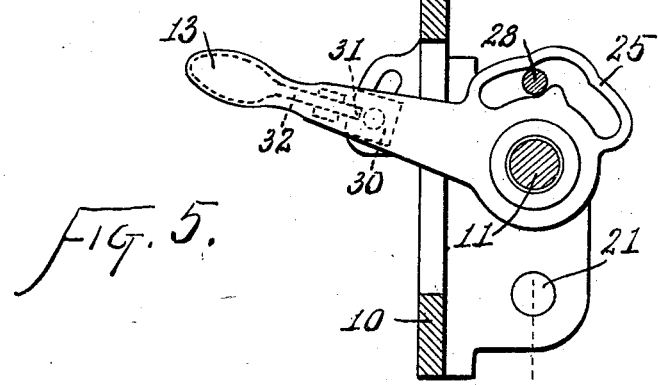

Figure 1 is a front elevation, part vertical section, of a screw mechanism, illustrating, somewhat diagrammatically, the principle of my invention; Fig. 2, a front elevation of the apron of an engine-lathe whose feed mechanism embodies an exemplification of my invention; Fig. 3, a vertical longitudinal section of the screw mechanism behind the apron of Fig. 2; Fig. 4, a horizontal section of the apron, the screw mechanism appearing in plan; and Fig. 5, a vertical transverse section of the apron and screw mechanism.

In the drawings and giving attention for the present exclusively to Fig. 1, 1 indicates a screw; 2, a thread cut upon it, (the word "thread" herein being taken to mean the furrow, as distinguished from the land of the screw;) 3, a second thread cut upon the screw, thus constituting it a double-threaded screw, the thread 3 being illustrated as very much shallower than thread 2 in order that thread 3 may be spoken of as the "shallow" thread, while thread 2 is spoken of as the "deep" thread, it being understood, however, that in practice the two threads may and will be of substantially identical contour; 4, a sectional nut adapted to engage the deep thread of the screw; 5, a similar sectional nut adapted to engage the shallow thread of the screw, these sectional nuts typifying the well-known open- and-shut nut system very commonly employed in screw mechanism; 6, a nut-carrier supporting the two sectional nuts and susceptible of being viewed as the nut proper, of which the sections 4 and 5 are threaded adjuncts, the two sections being capable of closing motion independently upon the screw, as by sliding in mortises in the nut-carrier; 7, a binder at one end of sectional nut 5, binding that nut-section against endwise motion in its mortise in the nut-carrier, and 8 a similar binder for nut-section 4.

In Fig. 1 both nut-sections are disengaged from the screw. Consequently the turning of the screw is without translation effect upon the nut. If sectional nut 4 be put into engagement with the screw, then the deep threads of the screw become effective in producing translation of the nut, the shallow thread of the screw being without office. If now the sectional nut 4 be disengaged from the screw and sectional nut 5 be engaged with the screw, then the shallow thread of the screw will become effective in translating the nut and the deep thread will be without office. In this way a single screw with a plurality of threads may have its threads alternatively employed without the work of the active thread being influenced by the inactive thread. For instance, in an engine-lathe one of the threads and its individual nut may be employed exclusively for the precision work of screw-cutting, while the other thread may be employed for general purposes.

The principle of the invention does not require the actual disengagement of one of the nut members from the screw while the other nut-section is in action, it being sufficient that while one of the nut-sections is in use the alternative nut-section be in such condition of inactivity as will insure against the inactive thread of the screw detrimentally influencing or being detrimentally influenced by the working of the active thread. To illustrate this, let it be assumed that in Fig. 1 both of the nut-sections 4 and 5 are engaged with the screw. In such event both threads of the screw would be engaged in active work and subject to wear. Now under the conditions just mentioned let binder 7 be removed. The result will be that nut-section 5 will be loose in the nut-carrier and while still engaging the screw will do no work, the strains of translation being imposed entirely upon nut-section 4, even if the latter has the usual trifle of lost motion in its carrier. If, on the other hand, binder 7 were retained and binder 8 removed, then the strains of translation would be imposed upon nut-section 5, and nut-section 4, while still engaging the screw, would be practically free from strain. Again, while a plurality of threads upon the screw is essential to the principle of my invention a plurality of nuts is not essential. In Fig. 1 I have illustrated for purposes of clearness a double-threaded screw with threads of dissimilar cross-section, explaining, however, that such dissimilarity was in no wise essential. Assume that in Fig. 1 both threads of the screw were like the deep thread, so that sectional nut 4 would fit either of the threads. In that event it is obvious that the nut might be employed with one of the threads and used for general work and alternatively engage with the other thread when precision work was to be done, one of the threads of the screw thus being preserved exclusively for precision work and neither thread influencing the work of the other.

Having thus set forth the general principles of my invention, I will proceed with a description of the best mode in which I at present contemplate applying that principle, employing as an exemplification an engine-lathe in which a single lead-screw is to be employed for screw-cutting purposes and general purposes and also for the purpose of hand feeding or fleeting the carriage.

In Figs. 2, 3, 4, and 5 of the drawings, 9 indicates the lathe-carriage; 10, the apron; 11, the lead-screw with a plurality of threads; 12, the usual apron-crank, by means of which the carriage is fed or fleeted by hand; 13, a hand-lever mounted on the apron to serve in determining which of the two threads of the lead-screw, if any, shall become active; 14, 15, and 16, three bearings carried by the apron and having a common axis coincident with that of the lead-screw; 17, a rotary nut journaled in bearing 14 and engaging one of the threads of the lead-screw; 18, a rotary nut journaled in bearing 15 and engaging the other thread of the lead-screw; 19, a gear fast with nut 17; 20, a gear fast with nut 18; 21, a shaft journaled in the apron parallel with the lead-screw; 22, gearing connecting crank 12 with shaft 21; 23, gears fast on shaft 21 and engaging gears 19 and 20; 24, a bushing screwing through bearing 16 and adapted to impinge against the inner end alternatively of nut 17 or nut 18; 25, a cam fast on bushing 24, with which lever 13 is also fast, the lever therefore serving as means for turning bushing 24 and cam 25; 26, a longitudinally-slitted exteriorly-tapered extension of nut 18; 27, an interiorly-tapered sleeve fitting upon slitted extension 26 and adapted by moving farther onto the extension to clamp the extension upon the lead-screw; 28, a lever pivoted in the apron and having one end engaging cam 25 and having its other end in bell-crank form and engaging sleeve 27, whereby the rocking of this lever under the influence of the cam will cause the sleeve to clamp the slitted extension of nut 18 upon the screw or to permit it to unclamp therefrom; 29, a grooved collar upon sleeve 27 and engaged by lever 28, this grooved collar being adjustably screwed upon the sleeve so that it may be shifted along the same in order to insure that a given position of the lever as determined by the cam will bring about the proper clamping condition of the slitted extension of nut 18; 30, an angularly-adjustable block supported by the apron alongside hand-lever 13; 31, a detent-notch in this block, and 32 a detent carried by hand-lever 13 and adapted to engage notch 31.

Assume the lead-screw as being stationary, and assume that bushing 24 fills in between the ends of nuts 17 and 18, so as to substantially prevent end play by either nut, and assume that slitted extension 26 is not clamping upon the screw. If now crank 12 be turned, it will result in the turning of the two nuts and the traversing of the carriage along the lead-screw and lathe-bed. The same would be the result even if the lead-screw were in motion, except that there would be a modification of the translating effect due to the turning of crank 12. The mechanism can thus be employed for the hand-feeding or for the fleeting of the lathe-carriage.

Under the conditions just assumed both of the nuts 17 and 18 would be accomplishing work and wearing strain would be imposed upon both of the threads of the lead-screw. Such behavior is not consistent with the desire to use the threads of the screw alternatively. Hence provision is made for rendering negative either of the two nuts alternatively. Let it be assumed that the left-hand nut 17 engages that thread of the lead-screw which is to be preserved as the precision-thread, the general feeding work of the lathe being done by the right-hand nut 18. Hand-lever 13 is to be angularly adjusted, so as to move bushing 24 endwise toward nut 18 and away from nut 17, the result being that general-purpose nut 18, while free to turn and having the degree of endwise lost motion incident to such turning, becomes provided with thrust-bearings, while precision-nut 17 is practically free from thrust-bearings, the active nut thus being longitudinally restrained to a superior degree. Under these conditions all of the strains of work will be imposed upon general-purpose nut 18, and precision-nut 17 will be practically free of strain. The endwise movement of bushing 24 need be but a trifle in extent, it being sufficient that the nut that is to be effective is bound endwise within closer limits than the nut that is to be idle.

In the utilization just referred to the lead-screw has been assumed as stationary and the device as being employed in shifting the carriage by hand without strains upon the precision-thread of the screw. If now the rotation of the screw is to impart movement to the carriage for general feeding purposes, then hand-lever 13 is to be put in such position as to cause bushing 24 to clamp general-purpose nut 18 to its bearing. Both nuts then become stationary nuts; but the strains of work are imposed only upon general-purpose nut 18, the precision-nut 17 being unbound endwise, and consequently practically free from strain. If precision work is in hand, then hand-lever 13 is adjusted so as to clamp precision-nut 17 in its bearing and leave general-purpose nut 18 free endwise, the strains of working then becoming imposed upon the precision-thread of the screw and its translating effect being uninfluenced by any inaccuracies of the general-purpose thread of the screw, by reason of the fact that the general-purpose nut 18 is endwise free in its bearing.

If the carriage is to remain stationary while the lead-screw turns, then of course the nuts must turn with the lead-screw. The friction of the threads of the screw cannot be depended upon to produce this rotation and overcome the friction of the nuts in their bearings and of the mechanism connected with the nuts. To provide for this, hand-lever 13 is to be put in such position that cam 25 will cause lever 28 to pull sleeve 27 up on the slitted extension of nut 18 and clamp that nut firmly to the lead-screw, thus insuring that it will turn with the lead-screw, the connecting-gearing insuring the simultaneous turning of nut 17. As cam 25 has a definite throw and as its point of maximum throw must be passed in bringing one or the other of the nuts into action, it follows that sleeve 27 must be arranged to perform its proper clamping office upon the lead-screw as the cam reaches its point of maximum effect upon lever 28; but this can be adjusted for by shifting grooved collar 29 upon sleeve 27, upon which it is threaded for purposes of adjustment. The nature of the clamping work of sleeve 27 and the nature of the clamping work of screw-bushing 24 is such that hand-lever 13 will stay in position when put to active clamping positions; but when the bushing is to furnish a thrust-bearing, but not a clamp, for one of the nuts then a detent becomes necessary for the hand-lever, and such detent is provided in the notch in block 30, which may be angularly shifted to alter the position of detention.

I claim as my invention—

1. In a screw mechanism, the combination, substantially as set forth, of a screw provided with a plurality of threads, a nut therefor formed of separate members engaging the several threads of the screw, respectively, a support for said nut members permitting of their longitudinal movement relative to each other, and means for restricting the longitudinal movement of one of said nut members to a greater degree than the other of said nut members.

2. In a screw mechanism, the combination, substantially as set forth, of a screw provided with a plurality of threads, a nut therefor formed of two rotary members engaging the several threads of the screw, respectively, bearings supporting each of said nut members and permitting end play of the nut members therein, and thrust-bearings adapted to engage said nut members, alternatively, and limit to a superior degree the end play of the selected one of the nut members.

3. In a screw mechanism, the combination, substantially as set forth, of a screw provided with a plurality of threads, a nut therefor formed of two separate rotary members engaging the several threads of the screw, respectively, bearings supporting the nut members and permitting end play of those members, and thrust-bearings arranged to engage said nut members, alternatively, and clamp a selected one of them endwise in its bearing while leaving the other nut member free endwise in its bearing.

4. In a screw mechanism, the combination, substantially as set forth, of a screw provided with a plurality of threads, a nut therefor formed of separate rotary members engaging the several threads of the screw, respectively, bearings supporting said nut members and permitting end play to said members, thrust-bearings adapted to engage said nut members, alternatively, and superiorly restrict the end play of the selected nut member, and gearing connecting the two nut members to cause them to rotate in unison.

5. In a screw mechanism, the combination, substantially as set forth, of a threaded screw mounted for rotation, a rotatable nut therefor mounted in a bearing, mechanism for turning the nut relative to the screw, and a clamp connected with said nut and adapted to clamp it to the screw so that it will turn with the screw.

6. In a screw mechanism, the combination, substantially as set forth, of a threaded screw, a rotatable nut therefor mounted in a bearing, mechanism for turning the nut relative to the screw, an exteriorly-tapered slitted extension of said nut adapted to clamp upon the screw, and a sleeve fitting said extension and adapted to compress it upon the screw.

7. In a screw mechanism, the combination, substantially as set forth, of a screw provided with a plurality of threads, a nut therefor formed of two rotary members engaging the several threads of the screw, respectively, bearings supporting said nut members and permitting end play to them, a rotary and endwise-movable thrust-bearing adapted to act upon said nut members alternatively, a handle for adjusting said thrust-bearings, a cam moving with said handle, a clamp carried by one of said nut members and adapted to clamp that nut member to the screw, and mechanism connecting said cam and clamp and serving to cause said lever to simultaneously move said thrust-bearing and actuate said clamp.

8. In a screw mechanism, the combination, substantially as set forth, of a screw provided with a plurality of threads, a nut therefor formed of two rotary members engaging the several threads of the screw, respectively, bearings supporting said nut members and permitting end play to them, a rotary and endwise-movable thrust-bearing adapted to act upon said nut members alternatively, a handle for adjusting said thrust-bearings, a cam moving with said handle, a clamp carried by one of said nut members and adapted to clamp that nut member to the screw, mechanism connecting said cam and clamp and serving to cause said lever to simultaneously move said thrust-bearing and actuate said clamp, a detent carried by said lever, and an angularly-adjustable block provided with a notch adapted to be engaged by said detent.

9. In a screw mechanism, the combination, substantially as set forth, of a screw provided with a plurality of threads, a nut formed of two rotary members each engaging a single separate thread of the screw, respectively, bearings for said nut members, a handle for turning the two nut members, gearing on each nut member, and gearing connecting said handle with the gearing on the nut members to cause the handle to transmit rotation simultaneously but independently to the two nut members, and means for rendering either of the nut members, alternatively, free of the active strain of work.

WILLIAM L. SCHELLENBACH.

Witnesses:
H. R. KENNEDY,
GEO. W. BARRETT.